United States Patent
Vytyaz et al.

(10) Patent No.: US 11,631,218 B2
(45) Date of Patent: Apr. 18, 2023

(54) EFFICIENT COMPRESSION OF DATA REPRESENTING TRIANGULAR MESH ATTRIBUTES

(71) Applicant: Google LLC, Mountain View, CA (US)

(72) Inventors: Igor Vytyaz, San Jose, CA (US); Ondrej Stava, San Jose, CA (US); Michael Hemmer, San Francisco, CA (US); Xiaoxu Meng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/309,371

(22) PCT Filed: Dec. 5, 2019

(86) PCT No.: PCT/US2019/064668
§ 371 (c)(1),
(2) Date: May 21, 2021

(87) PCT Pub. No.: WO2020/123252
PCT Pub. Date: Jun. 18, 2020

(65) Prior Publication Data
US 2022/0020211 A1 Jan. 20, 2022

Related U.S. Application Data

(60) Provisional application No. 62/778,270, filed on Dec. 11, 2018.

(51) Int. Cl.
*G06T 17/20* (2006.01)
*G06T 9/00* (2006.01)
(52) U.S. Cl.
CPC ............ *G06T 17/20* (2013.01); *G06T 9/001* (2013.01)

(58) Field of Classification Search
None
See application file for complete search history.

(56) References Cited

U.S. PATENT DOCUMENTS

| | | | | |
|---|---|---|---|---|
| 6,047,088 A | * | 4/2000 | van Beek | H04N 19/46 375/E7.11 |
| 6,167,159 A | * | 12/2000 | Touma | G06T 17/20 382/242 |

(Continued)

FOREIGN PATENT DOCUMENTS

| | | |
|---|---|---|
| EP | 3410401 A1 | 12/2018 |
| GB | 2561824 A | 10/2018 |

OTHER PUBLICATIONS

Chen, et al., "Compression of 3D Triangle Meshes With a Generalized Parallelogram Prediction Scheme Based on Vector Quantization", 2010 Sixth International Conference on Intelligent Information Hiding and Multimedia Signal Processing, 2010, pp. 184-187.

(Continued)

*Primary Examiner* — Sultana M Zalalee
(74) *Attorney, Agent, or Firm* — Brake Hughes Bellermann LLP

(57) ABSTRACT

Techniques of compressing triangular mesh data involve generating a neighborhood table (i.e., a table) of fixed size that represents a neighborhood of a predicted vertex of a triangle within a triangular mesh for input into a machine-learning (ML) engine. For example, such a neighborhood table as input into a ML engine can output a prediction for a value (e.g., a position) of a vertex. The residual between the prediction and the actual value of the vertex is stored in an array. The data in the array representing the residuals may be compressed and transmitted over a network. Upon receipt by a computer, the array may be decompressed by the computer. Obtaining the actual value involves the receiving (Continued)

computer generating the same neighborhood table, inputting that neighborhood table into the same ML engine to produce the predicted value, and adding the predicted value to the residual from the decompressed file.

20 Claims, 10 Drawing Sheets

(56) References Cited

U.S. PATENT DOCUMENTS

| | | | |
|---|---|---|---|
| 6,169,549 B1 * | 1/2001 | Burr | G06T 9/001 345/419 |
| 6,262,737 B1 * | 7/2001 | Li | G06T 17/20 375/E7.092 |
| 7,342,580 B1 * | 3/2008 | Peterson | G06T 13/40 345/473 |
| 2011/0285708 A1 * | 11/2011 | Chen | G06T 9/004 345/420 |
| 2012/0075302 A1 * | 3/2012 | Cai | G06T 9/004 345/420 |
| 2012/0188241 A1 * | 7/2012 | Ahn | G06T 17/20 345/420 |
| 2012/0189220 A1 * | 7/2012 | Ahn | G06T 17/205 382/238 |
| 2013/0114910 A1 * | 5/2013 | Mammou | G06T 9/004 382/233 |
| 2020/0151952 A1 * | 5/2020 | Aksit | G06N 3/084 |

OTHER PUBLICATIONS

Courbet, et al., "Taylor Prediction for Mesh Geometry Compression", Computer Graphics Forum, The Eurographics Association and Blackwell Publication Ltd., vol. 30 (2011), No. 1, 2011, pp. 139-151.

Maglo, et al., "3D Mesh Compression: Survey, Comparisons, and Emerging Trends", ACM Computing Surveys, vol. 47, No. 3, Article 44, Feb. 17, 2015, 41 pages.

International Search Report and Written Opinion for PCT Application No. PCT/US2019/064668, dated Mar. 17, 2020, 17 pages.

* cited by examiner

EFFICIENT COMPRESSION OF DATA REPRESENTING TRIANGULAR MESH ATTRIBUTES

CROSS-REFERENCE TO RELATED APPLICATIONS

This application is a 35 U.S.C. § 371 National Phase Entry Application from PCT/US2019/064668, filed on Dec. 5, 2019, entitled "EFFICIENT COMPRESSION OF DATA REPRESENTING TRIANGULAR MESH ATTRIBUTES", which claims the benefit of U.S. Provisional Application No. 62/778,270, filed on Dec. 11, 2018, entitled "EFFICIENT COMPRESSION OF DATA REPRESENTING TRIANGULAR MESH ATTRIBUTES", the disclosures of which are incorporated by reference herein in their entirety.

TECHNICAL FIELD

This description relates to compression of three-dimensional object data.

BACKGROUND

Many applications, such as video games in virtual reality (VR), office applications in augmented reality (AR), and mapping software applications, involve representing three-dimensional objects to a user. In one example, an adventure game played by a user in a virtual reality environment may require the representation of virtual trees, rocks, and people. In another example, a mapping application may require the representation of buildings. In some applications, each such object can include a triangular mesh having a plurality of vertices, i.e., points in space that form triangles. Such a triangular mesh involves a plethora of triangular mesh data that may be stored on a disk and transmitted to the user. Storing and transmitting this type of triangular mesh data can be inefficient or deficient in some applications using known compression techniques.

SUMMARY

In a general aspect, a method includes receiving, by processing circuitry of a computer configured to represent information related to a surface of a three-dimensional object, data representing a triangular mesh for the surface, the triangular mesh including a plurality of vertices, the data including a plurality of vertex parameter values, each of the plurality of vertex parameter values corresponding to a respective vertex of the plurality of vertices and including a respective primary attribute value and a respective secondary attribute value. The method can also include, for a vertex of the plurality of vertices, defining, by the processing circuitry, a neighborhood of the vertex, the neighborhood of the vertex including a set of neighboring vertices, the set of neighboring vertices including a subset of the plurality of vertices. The method further includes The method further includes performing, by the processing circuitry, a prediction operation on vertex parameter values of the plurality of vertex parameter values corresponding to the vertices of the neighborhood to produce a predicted primary attribute value corresponding to the vertex, the prediction operation being derived based on a relationship between a primary attribute value of a vertex parameter value corresponding to a previous vertex of a previous triangular mesh and previous vertex parameter values corresponding to the vertices of the neighborhood of the previous vertex. The method further includes generating, by the processing circuitry, a residual array, an element of the residual array including a residual between the predicted primary attribute value corresponding to the vertex and the primary attribute value of the vertex parameter value corresponding to the vertex. The method further includes performing, by the processing circuitry, an encoding operation on the residual array to produce an encoded residual array, the encoded residual array providing a compressed representation of the primary attribute values of the plurality of vertices of the triangular mesh.

Implementations can include one or more of the following features, alone, or in any combination with each other. For example, the method can include generating a neighborhood table having a specified number of entries, each entry of the specified number of entries corresponding to a neighboring vertex of the set of neighboring vertices, each entry of the specified number of entries including a vertex parameter value corresponding to that neighboring vertex, wherein the prediction operation is performed on the neighborhood table. Performing the prediction operation can include using a convolutional neural network with the neighborhood table as input. Generating the neighborhood table can include ordering the specified number of entries of the neighborhood table according to an implicit traversal of the neighborhood of the triangular mesh. The implicit traversal may be defined with respect to a specific corner of the vertex. The implicit traversal of the neighborhood of the triangular mesh can include a breadth-first search. The primary attribute value of a vertex parameter value of the plurality of vertex parameter values corresponding to a neighboring vertex of the set of neighboring vertices includes a position of that neighboring vertex and the predicted primary attribute value includes a predicted position of the vertex. The secondary attribute value of a vertex parameter value of the plurality of vertex parameter values corresponding to a neighboring vertex of the set of neighboring vertices includes a valence of the neighboring vertex.

In another general aspect, a method includes receiving, by processing circuitry of a computer configured to represent information related to a surface of a three-dimensional object, data representing a triangular mesh for the surface, the triangular mesh including a plurality of vertices, the data including a plurality of vertex parameter values, each of the plurality of vertex parameter values corresponding to a respective vertex of the plurality of vertices and including a respective vertex identifier, a respective primary attribute value, and a respective secondary attribute value. The method also includes, for a vertex of the plurality of vertices, defining, by the processing circuitry, a neighborhood of the vertex, the neighborhood of the vertex including a set of neighboring vertices, the set of neighboring vertices including a subset of the plurality of vertices. The method further includes generating, by the processing circuitry, a neighborhood table having a specified number of entries, each entry of the specified number of entries corresponding to a neighboring vertex of the set of neighboring vertices, each entry of the specified number of entries including a vertex parameter value corresponding to that neighboring vertex. The method further includes performing, by the processing circuitry, a training operation on the neighborhood table and the primary attribute value of the vertex parameter value corresponding to the vertex to produce a prediction engine, the prediction engine being configured to perform prediction operations on other neighborhood tables to produce predictions of primary attribute values of vertex parameter values corresponding to vertices of other triangular meshes.

In another general aspect, a nontransitory storage medium, the computer program product including code that, when executed by processing circuitry of a user device configured to represent information related to a surface of a three-dimensional object, causes the processing circuitry to perform a method. The method can include receiving data representing a residual between a primary attribute value corresponding to a vertex of a plurality of vertices of a triangular mesh of the surface and a predicted primary attribute value corresponding to the vertex. The method can also include defining a neighborhood of the vertex, the neighborhood of the vertex including a set of neighboring vertices, the set of neighboring vertices including a subset of the plurality of vertices. The method can further include performing a prediction operation on the neighborhood table to produce a predicted primary attribute value corresponding to the vertex, the prediction operation being derived based on a relationship between a primary attribute value of a vertex parameter value corresponding to a previous vertex of a previous triangular mesh and a previous neighborhood table for the previous vertex. The method can further include adding the predicted primary attribute value to the residual to produce the primary attribute value corresponding to the vertex.

Implementations can include one or more of the following features, alone, or in any combination with each other. Performing the prediction operation can include using previously predicted values as primary attribute values. Generating the neighborhood table can include ordering the specified number of entries of the neighborhood table according to an implicit traversal of the neighborhood of the triangular mesh. The implicit traversal of the neighborhood of the triangular mesh can include a depth-first search. The primary attribute value of the vertex parameter value corresponding to a neighboring vertex of the set of neighboring vertices can include a normal of the surface at a corner corresponding to that neighboring vertex and the predicted primary attribute value includes a predicted normal of the surface in a vicinity of the vertex. The secondary attribute value of a vertex parameter value corresponding to a neighboring vertex of the set of neighboring vertices can include a valence of the neighboring vertex.

In another general aspect, an electronic apparatus configured to represent information related to a surface of a three-dimensional object can include memory and processing circuitry coupled to the memory. The processing circuitry can be configured to receive data representing a triangular mesh for the surface, the triangular mesh including a plurality of vertices, the data including a plurality of vertex parameter values, each of the plurality of vertex parameter values corresponding to a respective vertex of the plurality of vertices and including a respective primary attribute value and a respective secondary attribute value. The processing circuitry can also be configured to, for a vertex of the plurality of vertices, define a neighborhood of the vertex, the neighborhood of the vertex including a set of neighboring vertices, the set of neighboring vertices including a subset of the plurality of vertices. The processing circuitry can further be configured to generate a neighborhood table having a specified number of entries, each entry of the specified number of entries corresponding to a neighboring vertex of the set of neighboring vertices, each entry of the specified number of entries including a vertex parameter value corresponding to that neighboring vertex. The processing circuitry can further be configured to perform a prediction operation on the neighborhood table to produce a predicted primary attribute value corresponding to the vertex, the prediction operation being derived based on a relationship between a primary attribute values of a previous vertex of a previous triangular mesh and previous neighborhood table for the previous vertex. The processing circuitry can further be configured to generate a residual array, an element of the residual array including a residual between the predicted primary attribute value corresponding to the vertex and the primary attribute value of the vertex parameter value corresponding to the vertex. The processing circuitry can further be configured to perform an encoding operation on the residual array to produce an encoded residual array, the encoded residual array providing a compressed representation of the primary attribute values of the plurality of vertices of the triangular mesh.

Implementations can include one or more of the following features, alone, or in any combination with each other. The processing circuitry can be further configured to perform a quantization operation on the respective primary attribute value of each of the plurality of vertex parameter values. The processing circuitry can be further configured to perform a quantization operation on the predicted primary attribute value. The primary attribute value of a vertex parameter value of the plurality of vertex parameter values corresponding to a neighboring vertex of the set of neighboring vertices can include a position of the neighboring vertex and the predicted primary attribute value can include a predicted position of the vertex. The secondary attribute value of a vertex parameter value of the plurality of vertex parameter values corresponding to a neighboring vertex of the set of neighboring vertices can include a valence of the neighboring vertex.

The details of one or more implementations are set forth in the accompanying drawings and the description below. Other features will be apparent from the description and drawings, and from the claims.

DETAILED DESCRIPTION

Figure 1:
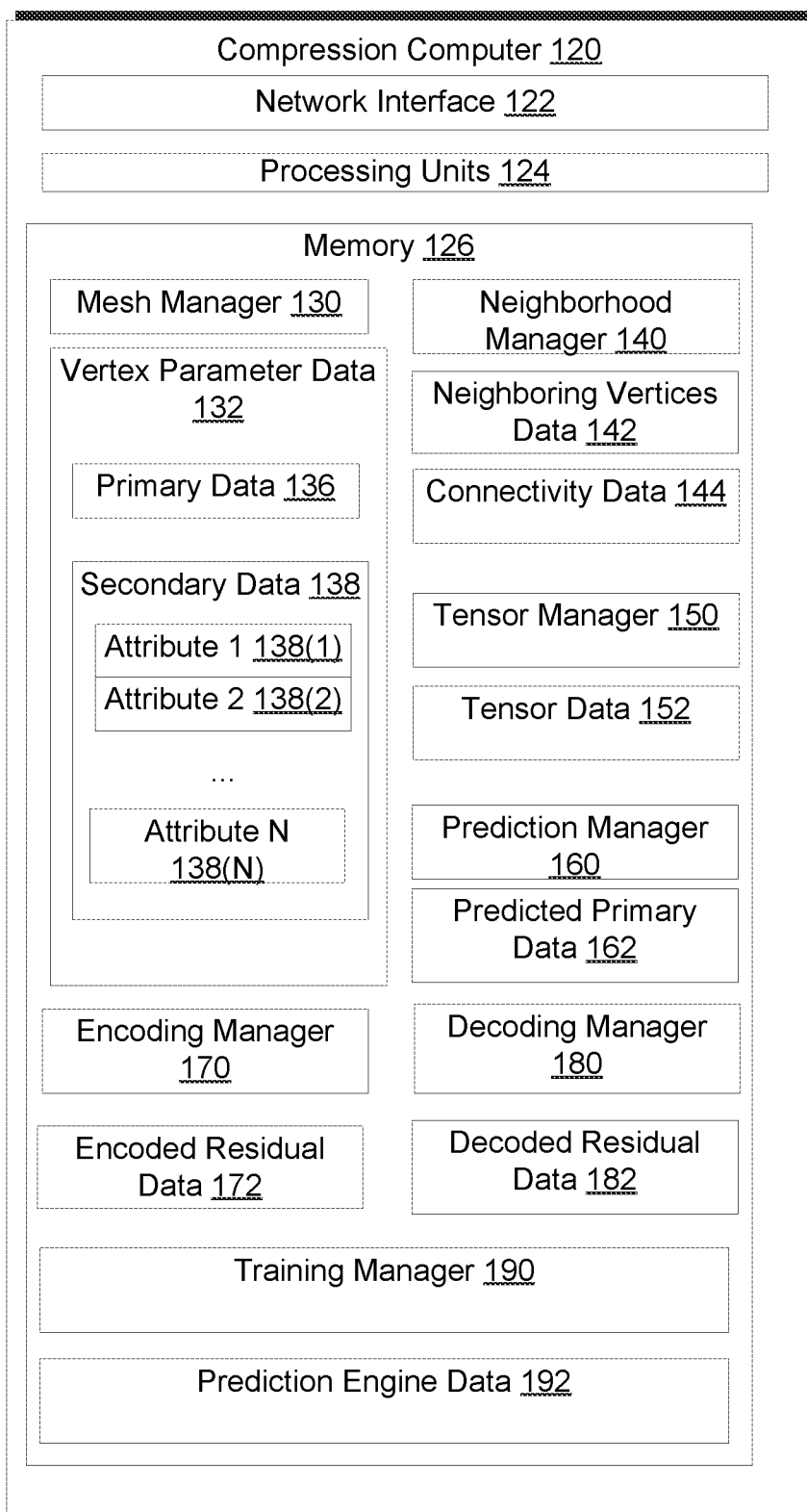
FIG. 1 is a diagram that illustrates an example electronic environment for implementing improved techniques described herein.

A mesh retrieved from a high-resolution scan can be represented by data including descriptors of vertices, edges, faces, and textures of each triangle that comprises the mesh. Representation of a surface of a three-dimensional object with a triangular mesh involves the storage, transmission, and/or manipulation of a plethora of data representing at least the vertices of the triangular faces of the mesh and a connectivity of the vertices forming the triangular mesh. The number of vertices used to represent the mesh depends on the complexity of the surface. A relatively smooth and flat surface may require only a small number of vertices. In contrast, a surface that has large variations in local curvature (e.g., a surface representing a human face) may require a large number of vertices. Such a large number of vertices is difficult to transmit over a network, even for the most advanced networks and processors.

Compression of meshes is a technique used to reduce the amount of data needed to represent a surface. Using a compressed representation, it is possible to transmit a representation of a three-dimensional object in relatively short time if the compression scheme used is sufficiently efficient. One way to increase the efficiency of a compression scheme is to compress, for example, a residual between positions of the vertices of the mesh and predicted positions of the vertices according to some prediction scheme. Such a sequence of residuals, if relatively small in magnitude compared to the positions themselves has a low entropy and compresses well. Generally speaking, the better the prediction the more likely the encoding results in a better compression.

A conventional approach to compressing triangular mesh data involves using the above-described per-corner prediction scheme. In parallelogram prediction, the position of a vertex is predicted to complete the parallelogram formed by the vertices of a neighboring triangle and only a corrective vector is stored. The sequence of residuals, which tend to spread around the zero vector, can be compressed more compactly than the sequence of positions.

A technical problem involved in the above-described conventional approach to compressing triangular mesh data representing a surface is that such an approach uses at most only a few known triangles. Accordingly, such an approach does not account for curvature of the surface or other local properties of the triangulation such as valence number. Such properties may define an extent of a neighborhood because of the large number of triangular faces representing a square inch of the surface. For example, meshes that have vertices with high valence numbers (i.e., a vertex belonging to many triangular faces of the mesh) can have large predictions residuals and are difficult to compress efficiently.

Other, more sophisticated approaches that address these local properties tend to have the technical problems of being slow and overly complex. For example, the above-described multi-parallelogram prediction uses information from all opposite faces opposite a vertex and results in better prediction than traditional parallelogram prediction. Nevertheless, multi-parallelogram prediction may be slower and more difficult to implement than traditional parallelogram prediction.

At least one technical solution to the above-described technical problem involves defining a neighborhood of the vertex, the neighborhood of the vertex including a set of neighboring vertices, and, more particularly, may involve generating a neighborhood table of fixed size that represents a neighborhood of a predicted vertex of a triangle within a triangular mesh for input into a prediction engine (a neighborhood of a specified vertex corresponds to, e.g., some specified number of vertices from the specified vertex). The neighborhood table includes primary attribute values and secondary attribute values associated with a vertex. The prediction engine is configured to output a predicted primary attribute value based on the neighborhood table. For example, when the prediction engine includes a machine learning (ML) engine, such a neighborhood table as input into a ML engine can output a prediction for a value (e.g., a position) associated with a vertex. The residual between the prediction and the actual value associated with the vertex (computed as the difference thereof) is stored in an array. The data in the array representing the residuals may be compressed and transmitted over a network. Upon receipt by a computer, the array may be decompressed by the computer. Obtaining the actual value involves the receiving computer generating the same neighborhood table, inputting that neighborhood table into the same ML engine to produce the predicted value, and adding the predicted value to the residual from the decompressed file.

In some implementations, the prediction engine can take the form of a module configured to produce a fit of the primary and secondary attribute values associated with the vertices of the triangular mesh to a specified functional form. In some implementations, the functional form is a polynomial. In some implementations, the polynomial has a low degree (e.g., less than 4). Generally, the functional form is based on the nature of the attribute to be predicted.

At least one technical advantage of the above-described technical solution is that the predicted values from the prediction engine output are more accurate than from predicted values resulting from the conventional approach to compressing triangular mesh data. Accordingly, such prediction from the prediction engine results in a more efficient compression. Furthermore, the predicted values can take into account curvature of the surface and local properties of the triangulation such as valence number.

FIG. 1 is a diagram that illustrates an example electronic environment 100 in which the above-described improved techniques may be implemented. As shown, in FIG. 1, the example electronic environment 100 includes a compression computer 120.

The compression computer 120 is configured to compress data associated with a triangular mesh representing a three-dimensional object. The compression computer 120 includes a network interface 122, one or more processing units 124 (processing circuitry), and memory 126. The compression computer 120 may take the form, in some implementations, of a virtual reality (VR) or augmented reality (AR) system and/or controller. In some implementations, the compression computer takes the form of a personal computer running a mapping software application. Such applications are described in more detail with regard to FIGS. 7A-7C.

In some embodiments, one or more of the components of the compression computer 120 can be, or can include, processors (e.g., processing units 124) configured to process instructions stored in the memory 126. Examples of such instructions as depicted in FIG. 1 include a mesh manager 130, a neighborhood manager 140, a neighborhood table manager 150, a prediction manager 160, an encoding manager 170, a decoding manager 180, and a training manager 190. In some implementations, the training manager 190 is included in a memory of another computer separate from the compression computer 120 to allow for meshes from other users to be included in training data. Further, as illustrated in FIG. 1, the memory 126 is configured to store various data, which is described with respect to the respective managers that use such data.

The mesh manager 130 is configured to obtain, store, and/or transmit vertex parameter data 132. In some implementations, the mesh manager 130 is configured to receive the vertex parameter data 132 over a network connection via the network interface 122. In some implementations, the mesh manager 130 is configured to produce the vertex parameter data 132. In some implementations, the mesh manager 130 is configured to retrieve the vertex parameter data 132 from a storage medium (e.g., a disk, a flash drive, or the like).

The vertex parameter data 132 represents information about the plurality of vertices of the triangular mesh representing the three-dimensional object. The vertex parameter data 132 provides a complete representation of the triangular mesh and any auxiliary properties of the mesh such a color of the faces and/or vertices, angles between faces that include a vertex, and angles of corners of faces of the mesh.

In some implementations, the vertex parameter data 132 further represents information about corners of the triangular faces of the mesh. A corner, as opposed to a vertex, is also associated with a particular face of the mesh, whereas a vertex may be associated with many faces depending on the valence, or degree, of the vertex. For example, a corner may contain information regarding attributes such as a normal, a texture, a color, and the like. In some implementations, one may perform a linear interpolation on the values of attributes over a face of the mesh given values at the corners.

A vertex can be associated with a value of an attribute if all corners at the vertex are associated with the value of the attribute. In this case the vertex is called smooth with respect to the attribute. If all vertices of a mesh are smooth vertices with respect to an attribute the mesh is called smooth with respect to the attribute. An example for a smooth attribute is the position attribute.

In some cases a mesh is not smooth with respect to an attribute if a vertex is not smooth with respect to the attribute. In this case the vertex is a crease vertex. An edge between two corners that are not associated with the same value is a crease edge. The set of all crease edges virtually splits the mesh into a set of connected components with respect to the attribute. A connected component from the set of connected components is a smooth mesh. Any mesh may consist of several connected components. Thus after the split, the union of all sets that can be handled as a smooth mesh with respect to the attribute.

A set of attribute values may represent a specific property with a value assigned to every vertex such as position coordinates (cartesian, polar, or another coordinate system), one or more texture coordinates, color, normals or some generic attribute that the user has chosen to attach to the mesh. Generic attributes may represent skinning coefficients, reflection index, refraction index, transparency or some other scalar or multidimensional attribute that may not be listed here. However, the process is not limited to the attributes listed above.

As shown in FIG. 1, the vertex parameter data 132 includes primary attribute value data 136 and secondary attribute value data 138. In some implementations, the vertex parameter data 132 includes vertex identifier data 134. The vertex identifier data 134 includes a respective identifier for each of the plurality of vertices of the triangular mesh. In some implementations, such an identifier takes the form of a number. In some implementations, such an identifier takes the form of a character or string of characters.

The primary attribute value data 136 represents the values that are to be encoded or decoded. In some implementations, the primary attribute value data 136 includes positions of the plurality of vertices of the triangular mesh in three-dimensional space. In some implementations, the positions are represented by three cartesian coordinates. In some implementations, the positions are represented by coordinates of another coordinate system such as cylindrical coordinates, spherical coordinates, and the like. In some implementations, the primary attribute value data 136 represents a value of a normal to the surface of the three-dimensional object in the vicinity of a vertex (e.g., at a corner adjacent to a vertex). In some implementations, the primary attribute value data 136 represents a value representing the position coordinates, texture coordinates, color, normal or some other generic attribute.

The secondary attribute data 138 may include values of one or several attributes (e.g., auxiliary properties described above). In some implementations, an attribute is an auxiliary property as described above, but having a parametric value. As shown in FIG. 1, the secondary attribute data 138 includes values of N attributes, 138(1), 138(2), . . . , 138(N), although in some implementations there is only one attribute. In some implementations, an attribute value corresponding to a vertex includes a color assigned to a corner adjacent to a vertex. In some implementations, an attribute value corresponding to a vertex includes angles of the corners of a face of the triangular mesh that includes the vertex. In some implementations, an attribute value corresponding to a vertex includes an angle between faces of the triangular mesh that include the vertex.

In some implementations, a secondary attribute value used in one prediction operation may be a primary attribute value for another prediction operation. For example, when each attribute is to be encoded, then that attribute value should be treated as a primary attribute value. In this case, in some implementations, a primary attribute value used in the one prediction operation may be used as a secondary attribute value in the other prediction operation.

The neighborhood manager 140 is configured to generate a neighborhood of a vertex of the plurality of vertices of the three-dimensional mesh based on a connectivity of the triangular mesh and hence produce neighboring vertices data 142. A neighborhood is, in some implementations, a set of vertices that result from a traversal (i.e., connectivity) with a specified number of steps (e.g., the fixed number of entries of a neighborhood table input into a ML engine). In some implementations, the neighboring vertices data 142 includes vertex identifiers of the vertices of the neighborhood. In some implementations, the neighboring vertices data 142 includes a number of vertices in the neighborhood of the vertex. In some implementations, the number of vertices is a specified number based on a fixed size of a neighborhood table, or neighborhood table, to be input into a prediction engine (e.g., neighborhood table data 152). In some implementations, a neighborhood is a region of a size and location defined by a specified size and/or number of vertices and the vertex. In some implementations the neighborhood is defined with respect to a corner of the vertex. Specifically one may obtain a different representation of the neighborhood for each corner, and hence a different prediction albeit for the same vertex.

The neighborhood manager 140 is also configured to select vertices in the neighborhood of the vertex by performing a traversal of the plurality of vertices of the triangular mesh based on connectivity data, which is already included in the processed data representing the triangular mesh.

In some implementation the traversal algorithm can be a traversal that operates on the dual graph. The dual graph is implicitly given by the graph represented in the connectivity data, that is, the traversal moves from a face to another by crossing edges.

A traversal can be defined with respect to a corner of the vertex. For instance, the first step may be to cross the edge opposite of the starting corner and continue according to a predefined algorithm that is identical for encoder and decoder. The table defining the neighborhood is then defined with respect to sequence in which the vertices are visited by the traversal. In some implementations a vertex may be visited several times and may occur accordingly in the sequence representing the neighborhood with respect to the corner.

In some implementations, the implicit traversal includes a breadth-first search (BFS). In a BFS, one orders vertices in a tree by level in the tree. For example, if in a tree in which vertices B and C depend from A, vertices D and E depend from B, and vertices F and G depend from C, then a BFS traversal would produce the order ABCDEFG.

In some implementations, the implicit traversal includes a depth-first search (DFS). In a DFS, one orders vertices in a tree by branch in the tree. For example, if in a tree in which vertices B and C depend from A, vertices D and E depend from B, and vertices F and G depend from C, then a DFS traversal would produce the order ABDECFG. Again, this order is, in general, abstracted as connectivity data that is implicit to the prediction engine. That is, the connectivity data 144 represents an assumption built into the prediction engine data 192.

In some implementations, the connectivity data may also represent additional rules related to the triangular mesh that affects the traversal order. For example, an additional rule in a BFS or DFS traversal may require that, when a step to the left or right can be taken in the mesh, the right step should be taken.

In some implementations, the connectivity data represents an explicit traversal of the triangular mesh. In some implementations, an explicit traversal takes the form of a set of rules for selecting the next vertex given any number of geometrical conditions (e.g., valence or degree of a vertex, angles of triangular faces with respect to one another). Such an explicit traversal is encoded, in some implementations, in connectivity data 144.

In some implementations, the traversal results in repeats of at least one of the vertices; that is, the neighboring vertices data 142 includes repeats of vertices. In such an implementation, the number of unique vertices of a neighborhood is less than the specified number of entries of a neighborhood table.

In some implementations, the traversal is encoded as connectivity data 144. The connectivity data 144 determines the context by which the prediction engine produces a predicted primary attribute value based on the vertex parameter data included in the input neighborhood table. In some implementations, the connectivity data includes a traversal order over vertices of the triangular mesh. In some implementations, the connectivity data includes a string of symbols, each symbol representing a direction to be taken in a next traversal step. In some implementations, the string of symbols is represented as a bit string, each symbol being represented by a bit string of a specified word length. For example, when there are 5 possible symbols, the word length is 32 bits.

In some implementations, some vertices of the triangular mesh are not known. For example, in a decompression operation, many of the primary attribute values corresponding to the vertices are not known. Rather, there are only primary attribute values of initial vertices as the compressed data only includes those few primary attribute values and residual between primary attribute values and predicted primary attribute values. In some implementations, some of the primary attribute values of the vertex parameter data 132 are arbitrary. In some implementations, the arbitrary data is generated by a random number generator. In some implementations, unknown vertices are not included in the neighboring vertices data 142.

The neighborhood manager 140 is configured to define the neighborhood of the triangular mesh corresponding to the vertex by employing a specified traversal scheme to select the vertices of the neighborhood in a particular order. The particular order is defined by the specified traversal scheme used to select the vertices of the triangular mesh. Further details of this selection are described with regard to FIG. 5.

The neighborhood table manager 150 is configured to generate neighborhood table data 152 from the vertex parameter data 132 corresponding to the vertices of the neighborhood of the neighboring vertices data 142. In some implementations, the neighborhood table manager 150 arranges the vertex parameter value corresponding to the vertices of the neighborhood according the order determined in the neighboring vertices data 142.

In some implementations, the neighborhood table data 152 includes a table (i.e., neighborhood table) that has entries. Each entry of the table corresponds to a vertex of the neighborhood. In some implementations, each entry has a vertex parameter value corresponding to the vertex. That is, each entry has a primary attribute value corresponding to the vertex and attribute values corresponding to the vertex. Further details of the neighborhood table data 152 are described with regard to FIG. 6.

In some implementations, the neighborhood table manager 150 is configured to perform a quantization operation on the primary attribute value of each entry of the table. The quantization operation generates a bit string for each primary attribute value of the table. The bit string generated for a primary attribute value has a length corresponding to an accuracy of an approximation of the primary attribute value that the quantization represents. For example, a replacement of a primary attribute value with a string of 10 bits as a result of the quantization operation is an approximation of the primary attribute value to within 1/1024 accuracy.

The prediction manager 160 is configured to perform a prediction operation on the neighborhood table data 152 to produce predicted primary attribute value data 162. In some implementations, the prediction operation uses a ML algorithm to make a prediction. In some implementations, the ML algorithm, i.e., the prediction operation, is derived based on a relationship between a primary attribute values of a previous vertex of a previous triangular mesh (e.g., from data previously received) and previous neighborhood table for the previous vertex. Such a relationship is determined, in some implementations, by a training operation described with regard to FIG. 4. In some implementations, the prediction manager 160 performs a quantization operation on the predicted primary attribute value data 162.

The predicted primary attribute value data 162 includes a predicted primary attribute value corresponding to the vertex. In some implementations, the ML manager 160 uses a neural network to perform the prediction operation. In some implementations, the ML manager 160 uses a convolutional neural network (CNN) to perform the prediction operation. In some implementations, the ML manager 160 uses a recurrent neural network (RNN) to perform the prediction operation. In some implementations, the ML manager 160 uses a support vector machine (SVM) to perform the prediction operation.

The encoding manager 170 is configured to form a residual between the actual primary attribute value of the vertex parameter value (included in the vertex parameter data 132) corresponding to the vertex and the predicted primary attribute value (included in the predicted primary attribute value 162) corresponding to the vertex. The encoding manager 170 is also configured to encode the residual to produce encoded residual data 172. In some arrangements, the encoding manager 170 uses an entropy encoder such as, e.g., arithmetic coding or Huffman coding to perform the encoding of the residual data 162. Ideally, there is as little variation in the residual data 162 across the plurality of vertices of the triangular mesh as possible so that the encoded residual data 172 has small entropy.

The decoding manager 180 is configured to decode the encoded residual data 172 to produce decoded residual data 182. Given the decoded residual data 182 and predictions made by the ML manager 160 operating on a neighborhood of each vertex of the plurality of vertices of the triangular mesh, each of the actual primary attribute values of the vertices of the triangular mesh may be deduced.

The training manager 190 is configured to produce ML engine data 192 based on training operations on training data. The training data, in some implementations, includes at least one triangular mesh, each of which have a plurality of vertices or corners to which vertex parameter data (e.g., vertex parameter data 132) corresponds. In some implementations, the training data includes a large number of meshes. As mentioned previously, in such implementations the training manager 190 is located in memory in computer different from the compression computer 120 so that the large number of meshes may be provided by several different users.

The ML engine data 192 takes a form depending on the ML algorithm being used. In some implementations, in which a CNN is used as the ML algorithm, the ML engine data 192 includes weights of various input, intermediate, and output layers. Such weights are adjusted with each training iteration.

The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

For most attributes of a mesh it is sufficient to assign a value for every corner of a triangle. The value for a point inside the triangle is obtained by interpolating the three values at the corners of the triangle on the client side. In some implementations, such interpolation is performed by a graphics card while the mesh is rendered and is not related to the decoding process.

As discussed above, a vertex is called smooth with respect to an attribute if every corner of the vertex is assigned the same value for the attribute. A mesh is smooth with respect to an attribute if every vertex of the mesh is smooth with respect to the attribute. The position attribute is always smooth.

The technical solution described herein may use the smoothness property. A vertex primary attribute value is obtained by computing a predicted primary attribute value for a corner of the vertex, which then defines the encoded residual value. That residual value, together with the predicted primary attribute value for the corner allows the decoder to recover the primary attribute value for the corner. By the implicit smoothness assumption, the value is then propagate to all other corners of the vertex, which allows us to refer to it as the primary attribute value of the vertex.

As discussed above, in some cases a mesh is not smooth with respect to an attribute. In such a case it is common practice to conceptually split the mesh into a plurality of mesh patches that are smooth with respect to the attribute. This requires an additional encoding step that identifies and encodes (marks) edges along which the mesh is conceptually split. Thereafter, the processes introduced herein can be applied to each mesh patch as each patch is smooth with respect to the attribute.

Some parts of the processes introduced herein may be considered as analogous to those used in per-corner prediction such as a parallelogram prediction. In parallelogram prediction a predicted value associated with a corner is computed using the parallelogram defined by the three primary attribute values of the corners of the opposing triangle. In one sense, parallelogram prediction can be interpreted as a naive version of other techniques that only use a very restricted neighborhood (e.g., three vertices or corners). However, one may also apply these processes to any generic prediction that use per-corner prediction as the primitive. For instance, a multi-per-corner prediction (e.g., multi-parallelogram prediction) obtains a predicted value associated with every available corner; a combined predicted primary attribute value for the vertex is then computed as an average of the predicted values associated with all available corners. A residual is then computed with respect to the final predicted value. Other generic prediction schemes include restricted multi parallelogram prediction, in which an encoder selects (but also has to encode in a separate context) the corners that should be included in the above process.

A possible generalization is to have a network that is able to process a small fixed number of neighborhoods of the vertex, each neighborhood defined with respect to a different corner of the vertex. This would correspond to multi per-corner prediction. In the case that the encoder is allowed to select the neighborhoods, such an encoder would use a restricted multi per-corner prediction.

Figure 2:
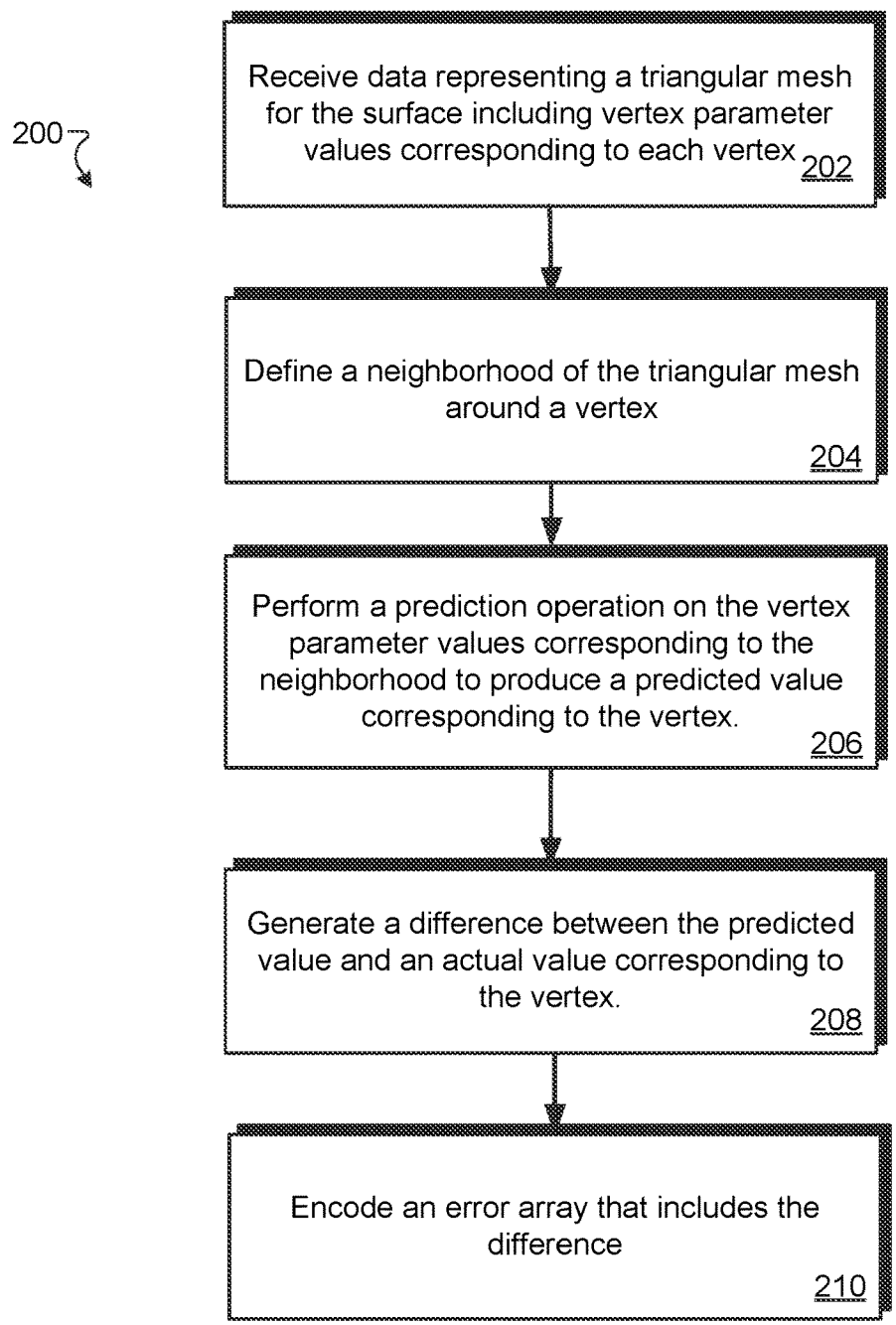
FIG. 2 is a diagram that illustrates an example method of performing the improved techniques within the electronic environment shown in FIG. 1.

FIG. 2 is a flow chart depicting an example method 200 of encoding triangular mesh data. The method 200 may be performed by software constructs described in connection with FIG. 1, which reside in memory 126 of the user device computer 120 and are run by the set of processing units 124.

At 202, the mesh manager 130 receives data representing a triangular mesh for a surface. The triangular mesh includes a plurality of vertices. The data includes a plurality of vertex parameter values (e.g., vertex parameter data 132). Each of the plurality of vertex parameter values corresponds to a respective vertex of the plurality of vertices and including a respective vertex identifier, a respective primary attribute value, and a respective secondary attribute value.

At 204, for a vertex of the plurality of vertices, the neighborhood manager 140 defines a neighborhood of the triangular mesh. The neighborhood of the triangular mesh includes a set of neighboring vertices. The set of neighboring vertices includes a subset of the plurality of vertices. The set of neighboring vertices is included in the neighboring vertices data 142.

At 206, the prediction manager 160 performs a prediction operation on the vertex parameter values corresponding to the set of neighboring vertices to produce a predicted primary attribute value corresponding to the vertex. The predicted primary attribute value is included in the predicted primary data 162. For example, the prediction operation is derived based on a relationship between a primary attribute value of a vertex parameter value corresponding to a previous vertex of a previous triangular mesh of previously received data and previous vertex parameter values corresponding to the vertices of the neighborhood of the previous vertex.

At 208, the encoding manager 170 generates a residual array. An element of the residual array includes a residual between the predicted primary attribute value corresponding to the vertex and the primary attribute value of the vertex parameter value corresponding to the vertex. The process described above in 204, 206, 208, and 210 is repeated for vertices of the triangular mesh so that the encoding manager 170 fills the residual array with such residuals.

At 210, the encoding manager 170 performs an encoding operation on the residual array to produce an encoded residual array. The encoded residual array provides a compressed representation of the surface that requires far less storage and/or less resources to transmit than other compressed representations based on conventional approaches to compressing mesh data.

In some implementations, the neighborhood table manager 150 generates a neighborhood table using vertex position as the primary attribute and no secondary attribute values as an encoding of the vertex position. In such an implementation, the vertex position may be used as a secondary attribute in a subsequent neighborhood table used to generate predictions of a different primary attribute value (e.g., normal at a corner corresponding to a vertex). Such a process may simplify the decoding of these attribute values. An example decoding process is described with regard to FIG. 3.

Figure 3:
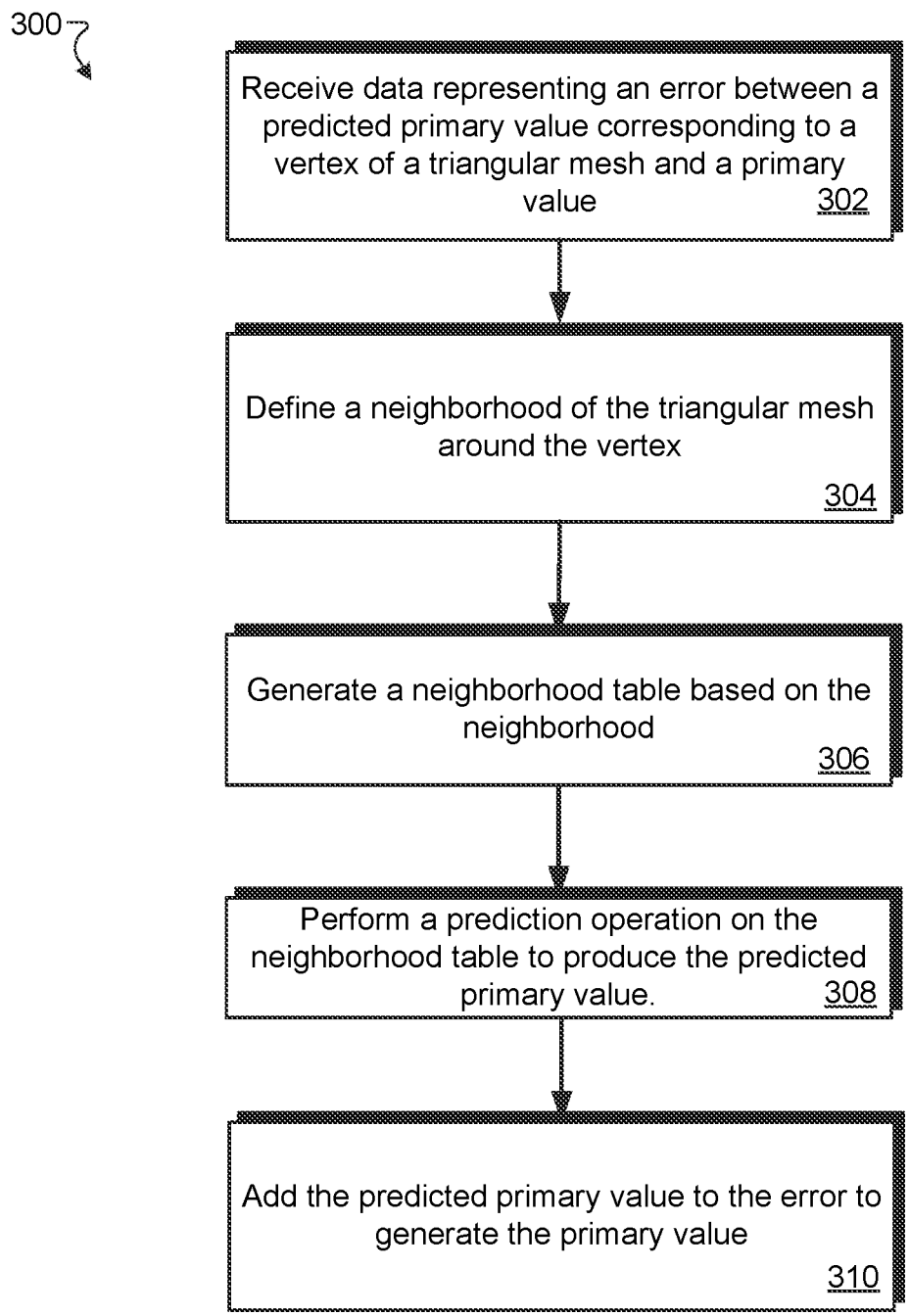
FIG. 3 is a diagram that illustrates another example method of performing the improved techniques within the electronic environment shown in FIG. 1.

FIG. 3 is a flow chart depicting an example method 300 of decoding triangular mesh data. The method 300 may be performed by software constructs described in connection with FIG. 1, which reside in memory 126 of the user device computer 120 and are run by the set of processing units 124.

At 302, the decoding manager 180 receives encoded data and performs a decompression operation on the encoded data. The decompression operation produces decoded residual data 182 representing a residual between a primary attribute value corresponding to a vertex of a plurality of vertices of a triangular mesh of the surface and a predicted primary attribute value corresponding to the vertex.

At 304, the neighborhood manager 140 defines a neighborhood of the triangular mesh. The neighborhood of the triangular mesh includes a set of neighboring vertices (e.g., the neighboring vertices data 142). The set of neighboring vertices includes a subset of the plurality of vertices.

At 306, the neighborhood table manager 150 generates a neighborhood table (e.g., neighborhood table data 152) having a specified number of entries (e.g., 15 entries, more than 15 entries, less than 15 entries). Each entry of the specified number of entries corresponds to a neighboring vertex of the set of neighboring vertices. Each entry of the set of entries includes a respective vertex parameter value. Each respective vertex parameter value includes a respective vertex identifier, a respective primary attribute value, and values of a set of attributes.

At 308, the prediction manager 160 performs a prediction operation on the neighborhood table to produce a predicted primary attribute value corresponding to the vertex. The predicted primary attribute value is included in the predicted primary data 162.

At 310, the mesh manager 130 adds the predicted primary attribute value to the residual to produce the primary attribute value corresponding to the vertex. This process is repeated for all residuals to reproduce the triangular mesh.

Figure 4:
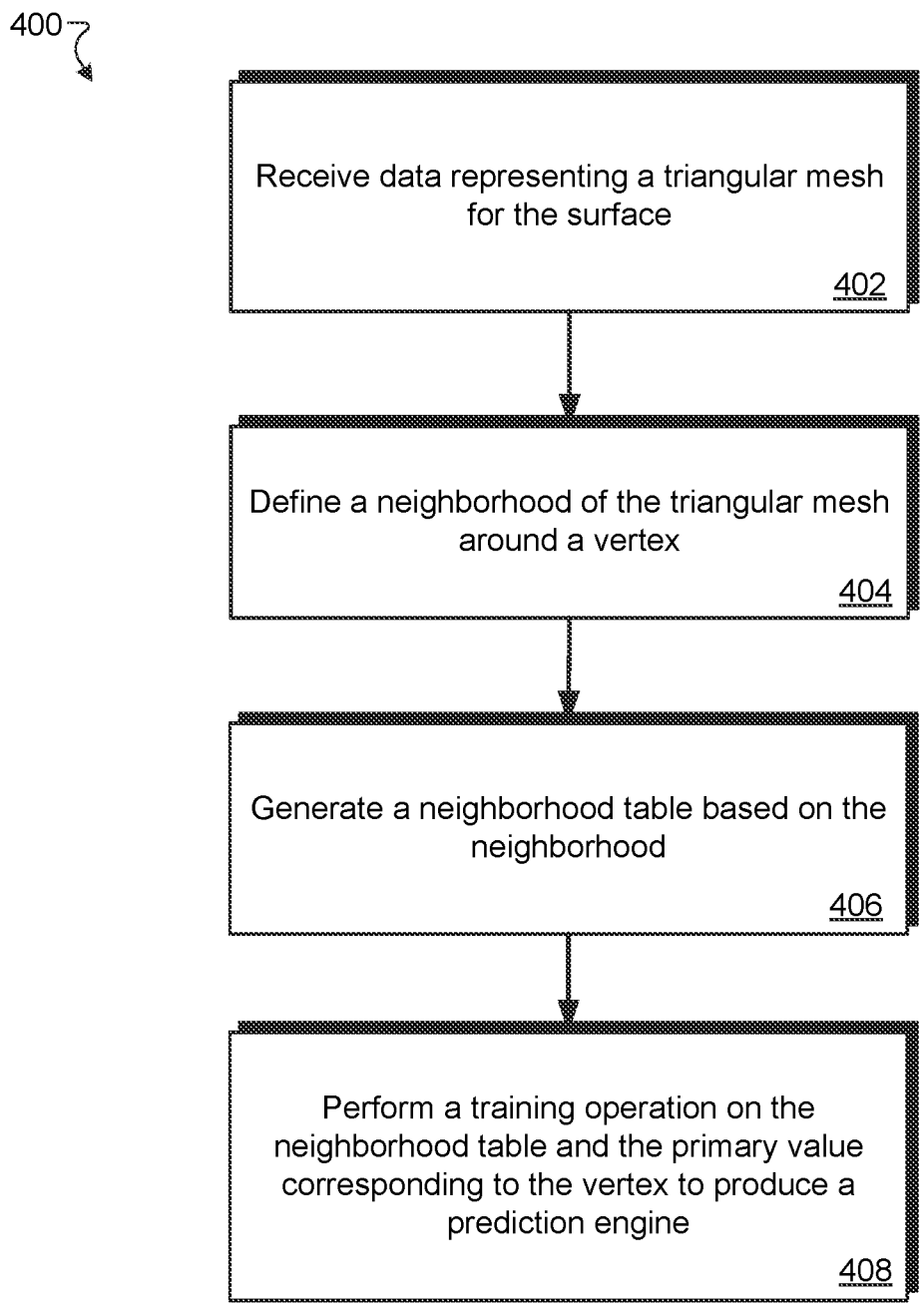
FIG. 4 is a diagram that illustrates another example method of performing the improved techniques within the electronic environment shown in FIG. 1.

FIG. 4 is a flow chart depicting an example method 400 of training a prediction engine for prediction of primary attribute values of vertices of triangular meshes. The method 400 may be performed by software constructs described in connection with FIG. 1, which reside in memory 126 of the user device computer 120 and are run by the set of processing units 124.

At 402, the mesh manager 130 receives data representing a triangular mesh for a surface. The triangular mesh includes a plurality of vertices. The data includes a plurality of vertex parameter values (e.g., vertex parameter data 132). Each of the plurality of vertex parameter values corresponds to a respective vertex of the plurality of vertices and including a respective vertex identifier, a respective primary attribute value, and values of a set of attributes.

At 404, for a vertex of the plurality of vertices, the neighborhood manager 140 defines a neighborhood of the triangular mesh. The neighborhood of the triangular mesh includes a set of neighboring vertices. The set of neighboring vertices includes a subset of the plurality of vertices. The set of neighboring vertices is included in the neighboring vertices data 142.

At 406, the neighborhood table manager 150 generates a neighborhood table having a specified number of entries. Each entry of the specified number of entries corresponds to a neighboring vertex of the set of neighboring vertices. Each entry of the set of entries includes a vertex parameter value corresponding to that neighboring vertex. The neighborhood table so generated is included in the neighborhood table data 152.

At 408, the training manager 190 performs a training operation on the neighborhood table and the primary attribute value of the vertex parameter value corresponding to the vertex to produce a prediction engine (e.g., prediction engine data 192). The prediction engine is configured to perform prediction operations on other neighborhood tables to produce predictions of primary attribute values of vertex parameter values corresponding to vertices of other triangular meshes.

Figure 5:
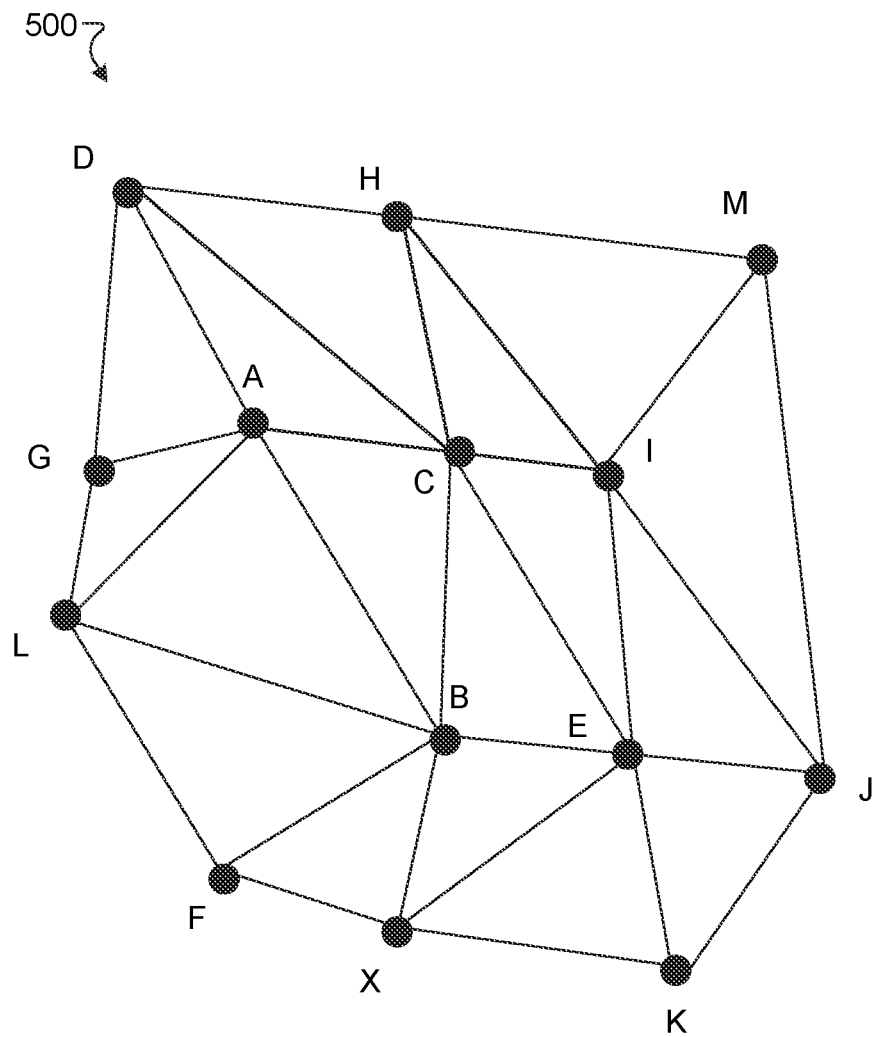
FIG. 5 is a flow chart that illustrates an example triangular mesh and a neighborhood within the electronic environment shown in FIG. 1.

FIG. 5 is a diagram illustrating an example triangular mesh 500 with vertex identifiers A-M at each vertex. There is also a vertex identifier X representing a vertex for which a neighborhood is to be determined by the neighborhood manager 140.

To generate a neighborhood of the vertex X, the neighborhood manager 140 selects an initial face of the triangular mesh. It is assumed that this initial face is that which is approximately determined by completing a parallelogram using the triangle XBE. This face is the triangle BEC.

Beginning with the triangle BEC, the neighborhood manager 140 uses a traversal scheme to define the neighborhood of the vertex X. In some implementations, the neighborhood manager 140 uses a BFS scheme. In some implementations, unlike BFS used in more ordinary situations, the neighborhood manager 140 is configured to allow repeated visits to a vertex during the traversal. This allowance of repeated visits of the same vertex provides flexibility to cope with irregular meshes by making the resulting ML engine more flexible.

Using the BFS traversal scheme with repeats, the resulting vertices for the neighborhood of the vertex when the number of neighbors is specified to be 17 are shown in Table 1.

TABLE 1

Neighborhood of Vertex X after BFS traversal with repeats

| B | E | C | A | I | L | D | H | J | F | G | G | H | D | M | M | K |
|---|---|---|---|---|---|---|---|---|---|---|---|---|---|---|---|---|

Other traversal schemes are possible. For example, a depth-first search (DFS) with repeats is used in some implementations. The result of such a DFS traversal is shown in Table 2 assuming the neighborhood includes 17 indices.

TABLE 2

Neighborhood of Vertex X after DFS traversal with repeats

| B | E | C | A | L | F | G | D | G | H | I | H | D | M | J | M | K |
|---|---|---|---|---|---|---|---|---|---|---|---|---|---|---|---|---|

Other traversal schemes such as a valence-based traversal may also be used as traversal schemes. Nevertheless, such traversal schemes are used consistently in the course of an encoding/decoding operation over a triangular mesh. Moreover, the result of such schemes may be altered as well. For example, in some implementations, the neighborhood manager 140 may remove the leftmost branch (e.g., vertices L, G, F) and/or the rightmost branch (e.g., vertices J, M, K) because the vertices F and K may not be known at the time of defining the neighborhood.

Figure 6:
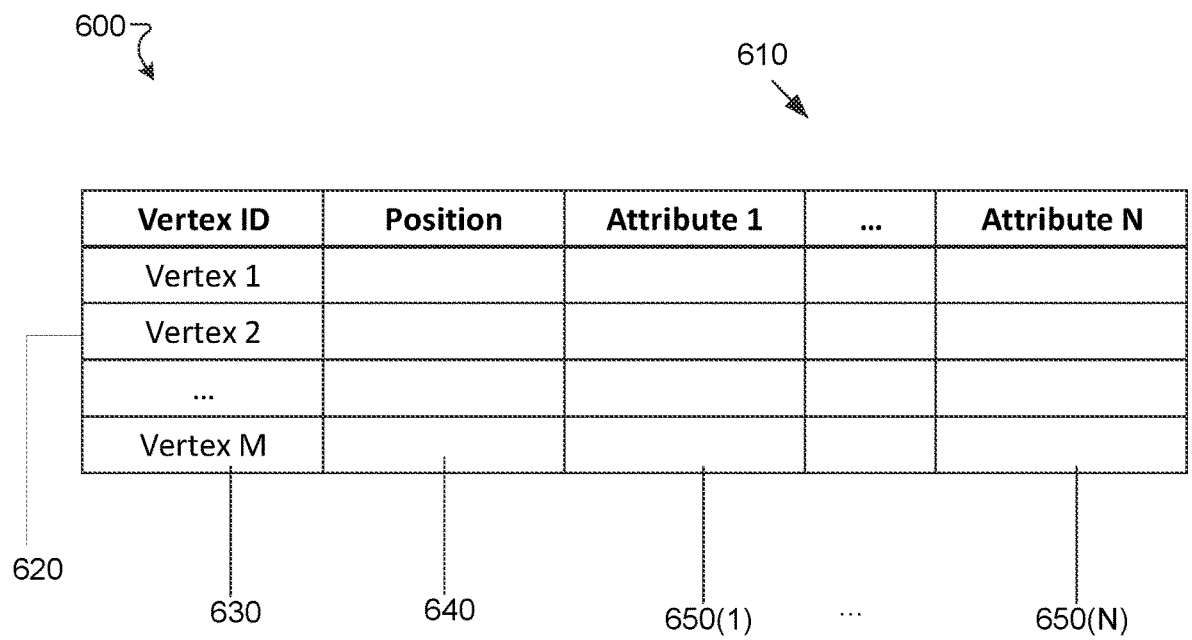
FIG. 6 is a diagram illustrating an example neighborhood table for input into a machine learning scheme within the electronic environment shown in FIG. 1.

FIG. 6 is a diagram 600 illustrating an example neighborhood table 610 that is input into a ML engine (e.g., ML engine data 192) to produce predicted primary data. The neighborhood table 610 includes a set of entries 620, each of the entries corresponding to a vertex of the neighborhood found by the neighborhood manager 140 as described above with regard to FIG. 5.

The neighborhood table 610 includes, for each entry 620, a value for a Vertex ID field 630, a value of a primary attribute value field 640 (the primary attribute value is shown is a vertex position in FIG. 6), and values of attribute fields 650(1), . . . , 650(N). In some implementations, there is no Vertex ID field in a neighborhood table.

The neighborhood table 610, so consistently defined for each vertex of the triangular mesh with respect to traversal schemes and ML algorithm used, is then an input into the prediction engine to produce predicted values of the primary attribute value. Because, in a well-trained prediction engine, the predictions of the primary attribute values can become very accurate, the resulting residual array over the triangular mesh has small values uniformly distributed about zero and is therefore highly compressible.

Figure 7A:
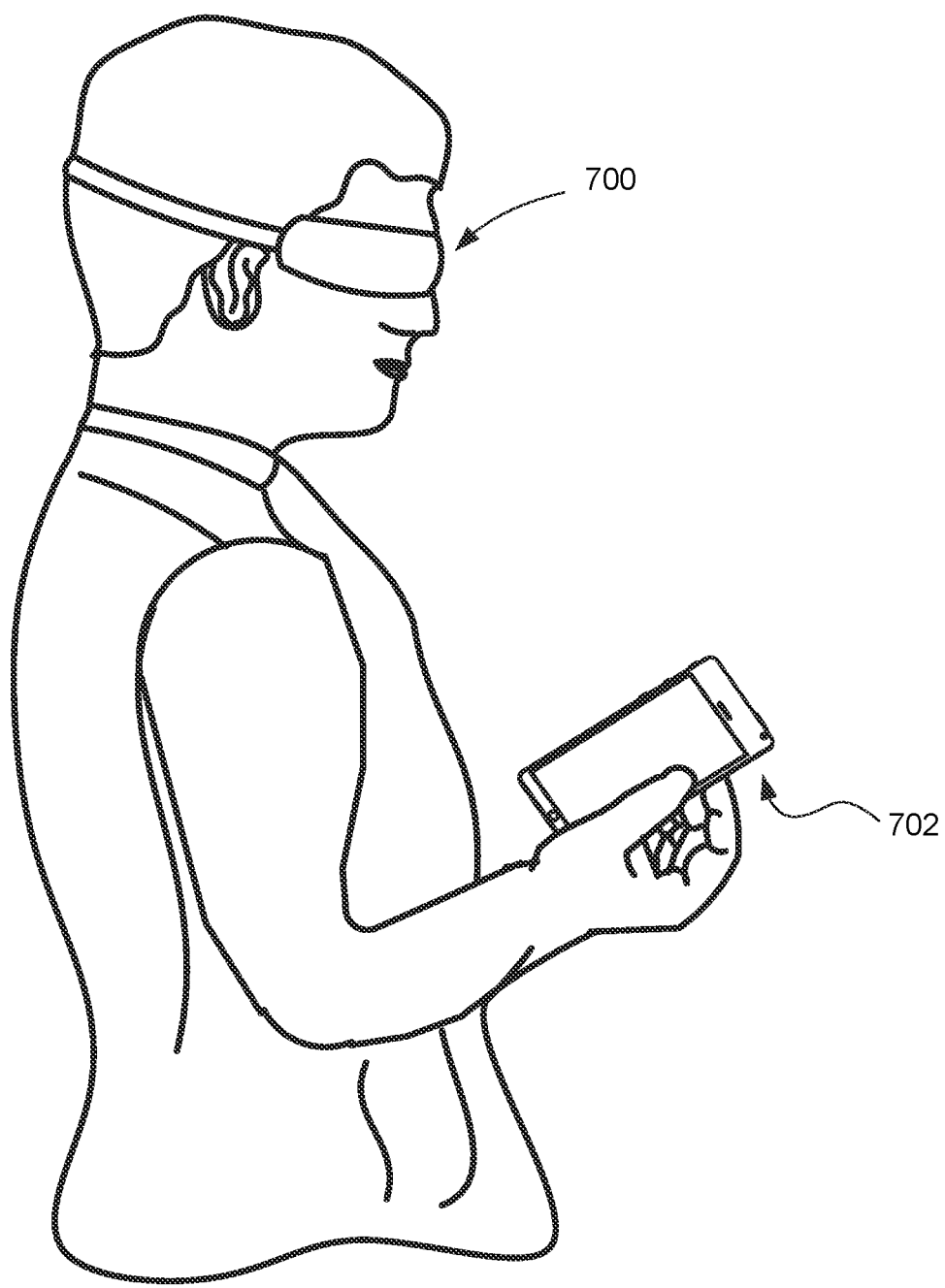
FIG. 7A illustrates an example implementation of a head-mounted display as used in a virtual reality (VR) or augmented reality (AR) application that uses triangular meshes to represent objects viewed on VR or AR displays.

FIG. 7A illustrates an example implementation of a head-mounted display as used in a virtual reality (VR) or augmented reality (AR) application that uses triangular meshes to represent objects viewed on VR or AR displays. In FIG. 7A, a user wearing an HMD 700 is holding a portable handheld electronic device 702. The handheld electronic device 702 may be, for example, a smartphone, a controller, a joystick, or another portable handheld electronic device(s) that may be paired with, and communicate with, the HMD 700 for interaction in the immersive virtual or augmented environment generated by the HMD 700.

In some implementations, the handheld electronic device 702 may be operably coupled with, or paired with the HMD 700 via, for example, a wired connection, or a wireless connection such as, for example, a WiFi or Bluetooth connection. This pairing, or operable coupling, of the handheld electronic device 702 and the HMD 700 may provide for communication between the handheld electronic device 702 and the HMD 700 and the exchange of data between the handheld electronic device 702 and the HMD 700. This may allow the handheld electronic device 702 to function as a controller in communication with the HMD 700 for interacting in the immersive virtual or augmented environment generated by the HMD 700. That is, a manipulation of the handheld electronic device 702, such as, for example, a beam or ray emitted by the handheld electronic device 702 and directed to a virtual object or feature for selection, and/or an input received on a touch surface of the handheld electronic device 702, and/or a movement of the handheld electronic device 702, may be translated into a corresponding selection, or movement, or other type of interaction, in the immersive virtual or augmented environment generated by the HMD 700. For example, the HMD 700, together with the handheld electronic device 702, may generate a virtual or augmented environment as described above, and the handheld electronic device 702 may be manipulated to effect a change in scale, or perspective, of the user relative to the virtual features in the virtual or augmented environment as described above.

Figure 7B:
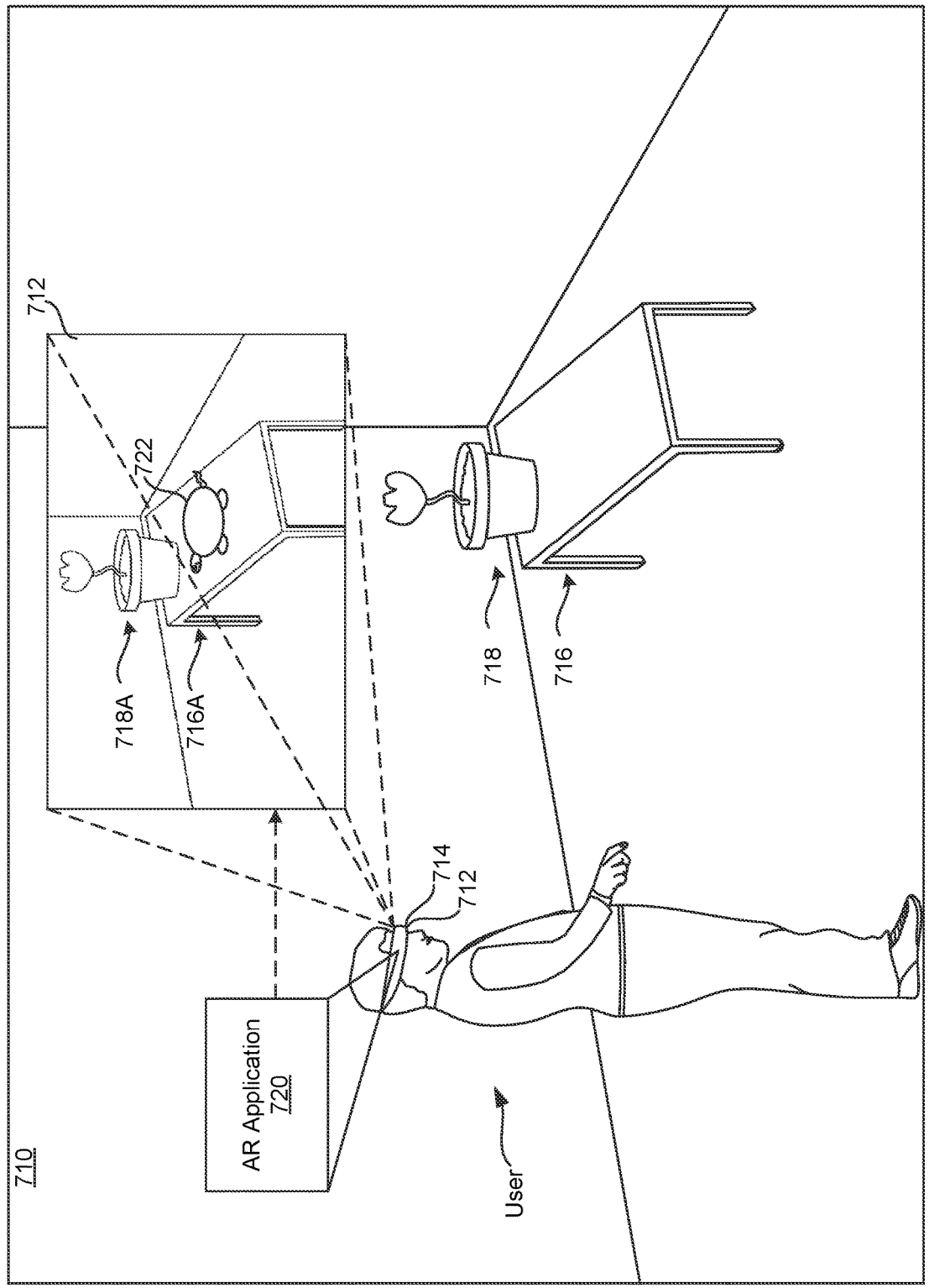
FIG. 7B illustrates an example implementation of an AR application with three-dimensional objects having complex surfaces.

FIG. 7B is a third person view of an example physical space 710, in which a user is experiencing an AR environment 712 through a display 708 of an HMD 714. The AR environment 712 can be generated by the AR application 720 and displayed to the user through the HMD 714, or other device. The AR environment 712 includes inserted AR object 722 (e.g., content) that is displayed over an image of the physical space 710. In this example, the AR object 722 is a turtle on a representation 716A of a table 716 near a representation 718A of a flower 718 in the AR environment 712.

The objects shown in FIG. 7B, including the turtle 722, the table, 716A, and the flower 718A are all represented with respective triangular meshes. Each of the triangular meshes representing these objects has a different number of vertices. For example, the table 716A may have much fewer vertices than portions of the flower 718A or the turtle 722. All of these objects will benefit from an efficient encoding scheme so that a user of the AR application 720 will experience the simulation provided in the AR environment 712. The ML-based approach described above may be used to provide such an efficient encoding of these objects.

Figure 7C:
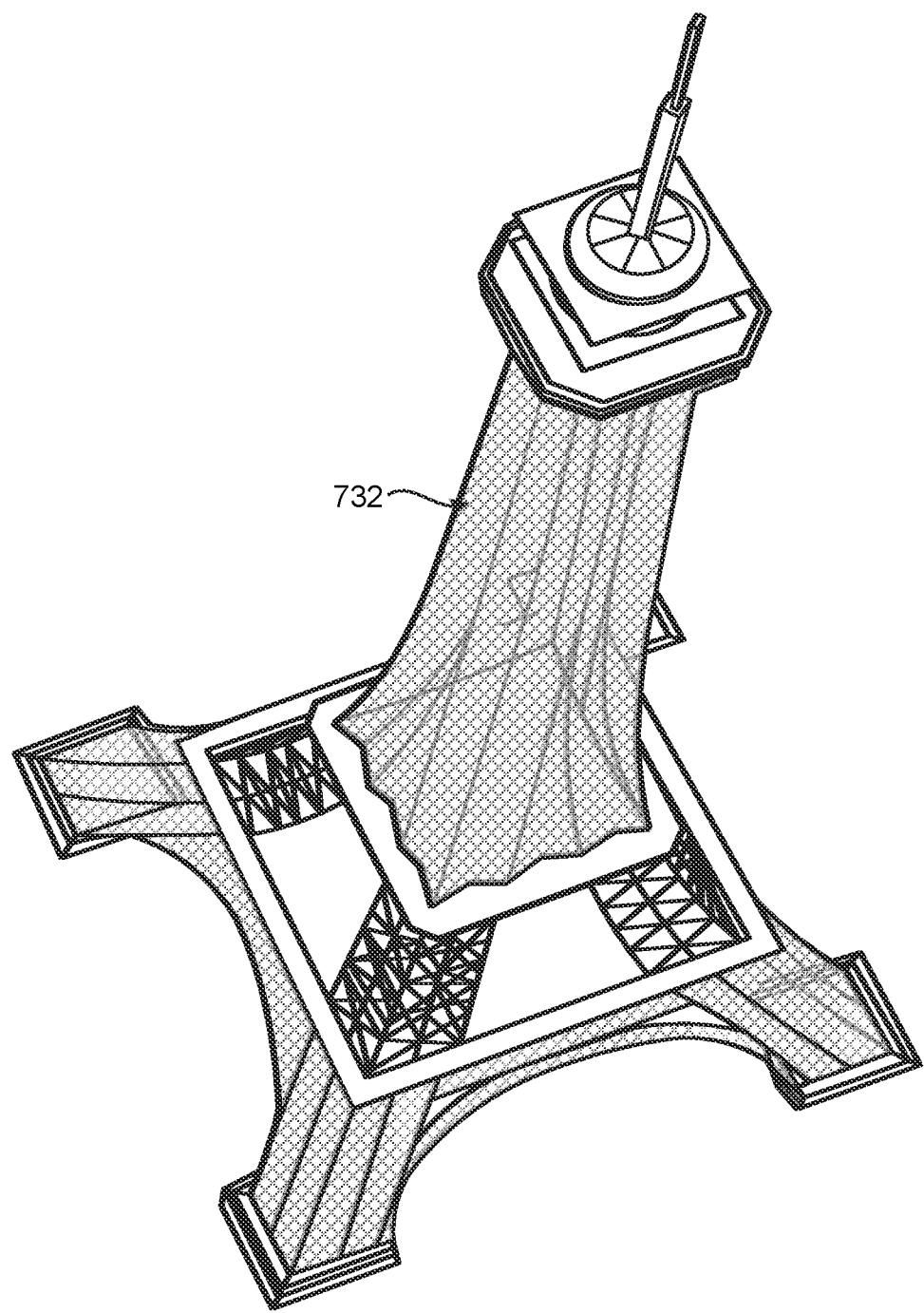
FIG. 7C illustrates an example three-dimensional object used in a mapping software application and its triangular mesh representation.

FIG. 7C is a view 730 of an object 732 in a mapping software application. The mapping software application may run on a traditional, two-dimensional display on a computer or within a VR or AR display on a VR/AR system. As shown in FIG. 7C, the object 732 represents the Eiffel tower as seen in the mapping software application. The representation of the object 732 involves a large triangular mesh with many vertices. An efficient compression scheme such as that described above may improve the rendering and transmission time involved in processing the sheer number of vertices in this representation.

Figure 8:
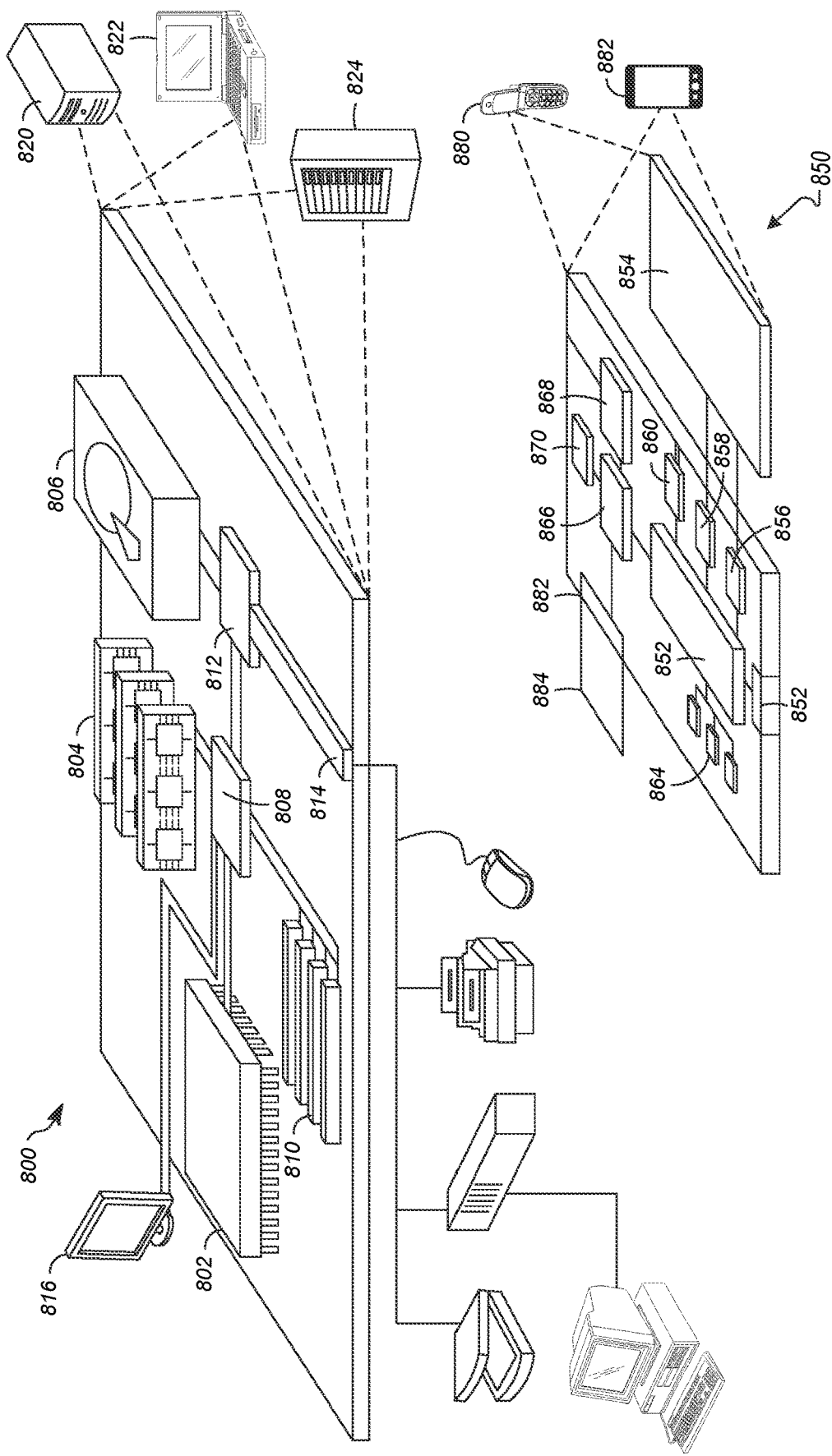
FIG. 8 illustrates an example of a computer device and a mobile computer device that can be used with circuits described here.

FIG. 8 illustrates an example of a generic computer device 800 and a generic mobile computer device 850, which may be used with the techniques described here.

As shown in FIG. 8, computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 450, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the compression computer 120 can be, or can include, any type of hardware and/or software configured to process attributes. In some implementations, one or more portions of the components shown in the components of the compression computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the compression computer 120 can be, or can include, a software module configured for execution by at least one processor (not shown). In some implementations, the functionality of the components can be included in different modules and/or different components than those shown in FIG. 1.

Although not shown, in some implementations, the components of the compression computer 120 (or portions thereof) can be configured to operate within, for example, a data center (e.g., a cloud computing environment), a computer system, one or more server/host devices, and/or so forth. In some implementations, the components of the compression computer 120 (or portions thereof) can be configured to operate within a network. Thus, the components of the compression computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 120 can be, or can include, processors configured to process instructions stored in a memory. For example, the mesh manager 130 (and/or a portion thereof), the neighborhood manager 140 (and/or a portion thereof), the tensoor manager 150 (and/or a portion thereof), the ML manager 160 (and/or a portion thereof), the encoding manager 170 (and/or a portion thereof), the decoding manager 180 (and/or a portion thereof), and the training manager 190 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by processing circuitry of a computer configured to represent information related to a surface of a three-dimensional object, data representing a triangular mesh for the surface, the triangular mesh including a plurality of vertices, the data including a plurality of vertex parameter values, each of the plurality of vertex parameter values corresponding to a respective vertex of the plurality of vertices and including a respective primary attribute value and a respective secondary attribute value;
   for a vertex of the plurality of vertices, defining, by the processing circuitry, a neighborhood of the vertex, the neighborhood of the vertex including a set of neighboring vertices, the set of neighboring vertices including a subset of the plurality of vertices;
   generating a neighborhood table having a specified number of entries, each entry of the specified number of entries corresponding to a neighboring vertex of the set of neighboring vertices, each entry of the specified number of entries including a vertex parameter value corresponding to that neighboring vertex; and
   performing, by the processing circuitry, a prediction operation on vertex parameter values of the plurality of vertex parameter values corresponding to the set of neighboring vertices of the neighborhood to produce a predicted primary attribute value corresponding to the vertex, the prediction operation being derived based on a relationship between a primary attribute value of a vertex parameter value corresponding to a previous vertex of a previous triangular mesh and previous vertex parameter values corresponding to the set of neighboring vertices of the neighborhood of the previous vertex, including using a convolutional neural network with the neighborhood table as input.

2. The method as in claim 1, wherein generating the neighborhood table includes ordering the specified number of entries of the neighborhood table according to an implicit traversal of a neighborhood of the vertex of the triangular mesh.

3. The method as in claim 2, wherein the implicit traversal of the neighborhood of the triangular mesh includes a breadth-first search.

4. The method as in claim 1, wherein the primary attribute value of a vertex parameter value of the plurality of vertex parameter values corresponding to a neighboring vertex of the set of neighboring vertices includes a position of that neighboring vertex and the predicted primary attribute value includes a predicted position of the vertex.

5. The method as in claim 1, wherein the respective secondary attribute value of a vertex parameter value of the plurality of vertex parameter values corresponding to a neighboring vertex of the set of neighboring vertices includes a valence of the neighboring vertex.

6. The method as in claim 1, wherein the respective secondary attribute value of a vertex parameter value of the plurality of vertex parameter values corresponding to a neighboring vertex of the set of neighboring vertices includes a position of that neighboring vertex and the predicted primary attribute value includes a predicted position of the vertex.

7. The method as in claim 1, further comprising:
generating a residual array, an element of the residual array including a residual between the predicted primary attribute value corresponding to the vertex and the primary attribute value of the vertex parameter value corresponding to the vertex; and
performing an encoding operation on the residual array to produce an encoded residual array, the encoded residual array providing a compressed representation of the primary attribute values of the plurality of vertex parameter values corresponding to the plurality of vertices of the triangular mesh.

8. A method, comprising:
receiving, by processing circuitry of a computer configured to represent information related to a surface of a three-dimensional object, data representing a triangular mesh for the surface, the triangular mesh including a plurality of vertices, the data including a plurality of vertex parameter values, each of the plurality of vertex parameter values corresponding to a respective vertex of the plurality of vertices and including a respective vertex identifier, a respective primary attribute value, and a respective secondary attribute value;
for a vertex of the plurality of vertices, defining, by the processing circuitry, a neighborhood of the vertex, the neighborhood of the vertex including a set of neighboring vertices, the set of neighboring vertices including a subset of the plurality of vertices;
generating, by the processing circuitry, a neighborhood table having a specified number of entries, each entry of the specified number of entries corresponding to a neighboring vertex of the set of neighboring vertices, each entry of the specified number of entries including a vertex parameter value corresponding to that neighboring vertex;
performing, by the processing circuitry, a training operation on the neighborhood table and the respective primary attribute value of the vertex parameter value corresponding to the vertex to produce a prediction engine, the prediction engine being configured to perform prediction operations on other neighborhood tables to produce predictions of primary attribute values of vertex parameter values corresponding to vertices of other triangular meshes.

9. The method as in claim 8, wherein the respective primary attribute value of a vertex parameter value of the plurality of vertex parameter values corresponding to a neighboring vertex of the set of neighboring vertices includes a position of that neighboring vertex and the predicted primary attribute value includes a predicted position of the vertex.

10. A computer program product comprising a nontransitory storage medium, the computer program product including code that, when executed by processing circuitry of a user device configured to represent information related to a surface of a three-dimensional object, causes the processing circuitry to perform a method, the method comprising:
receiving data representing a residual between a primary attribute value corresponding to a vertex of a plurality of vertices of a triangular mesh of the surface and a predicted primary attribute value corresponding to the vertex;
defining a neighborhood of the vertex, the neighborhood of the vertex including a set of neighboring vertices, the set of neighboring vertices including a subset of the plurality of vertices;
generating a neighborhood table having a specified number of entries, each entry of the specified number of entries corresponding to a neighboring vertex of the set of neighboring vertices, each entry of the specified number of entries including a respective vertex parameter value, each respective vertex parameter value including a respective vertex identifier, a respective primary attribute value, and a respective secondary attribute value;
performing a prediction operation on the neighborhood table to produce a predicted primary attribute value corresponding to the vertex, the prediction operation being derived based on a relationship between a primary attribute value of a vertex parameter value corresponding to a previous vertex of a previous triangular mesh and a previous neighborhood table for the previous vertex, including using a convolutional neural network with the neighborhood table as input; and
adding the predicted primary attribute value to the residual to produce the primary attribute value corresponding to the vertex.

11. The computer program product as in claim 10, wherein performing the prediction operation includes using previously predicted values as primary attribute values.

12. The computer program product as in claim 10, wherein generating the neighborhood table includes ordering the specified number of entries of the neighborhood table according to an implicit traversal of the neighborhood of the vertex.

13. The computer program product as in claim 12, wherein the implicit traversal of the neighborhood of the triangular mesh includes a depth-first search.

14. The computer program product as in claim 10, wherein the primary attribute value of the vertex parameter value corresponding to a neighboring vertex of the set of neighboring vertices includes a normal of the surface at a corner corresponding to that neighboring vertex and the predicted primary attribute value includes a predicted normal of the surface in a vicinity of the vertex.

15. The computer program product as in claim 10, wherein the respective secondary attribute value of a vertex parameter value corresponding to a neighboring vertex of the set of neighboring vertices includes a valence of the neighboring vertex.

16. An electronic apparatus configured to represent information related to a surface of a three-dimensional object, the electronic apparatus comprising:
  memory; and
  processing circuitry coupled to the memory, the processing circuitry being configured to:
    receive data representing a triangular mesh for the surface, the triangular mesh including a plurality of vertices, the data including a plurality of vertex parameter values, each of the plurality of vertex parameter values corresponding to a respective vertex of the plurality of vertices and including a respective primary attribute value and a respective secondary attribute value;
    for a vertex of the plurality of vertices, define a neighborhood of the vertex, the neighborhood of the vertex including a set of neighboring vertices, the set of neighboring vertices including a subset of the plurality of vertices;
    generate a neighborhood table having a specified number of entries, each entry of the specified number of entries corresponding to a neighboring vertex of the set of neighboring vertices, each entry of the specified number of entries including a vertex parameter value corresponding to that neighboring vertex; and
    perform a prediction operation on the neighborhood table to produce a predicted primary attribute value corresponding to the vertex, the prediction operation being derived based on a relationship between a primary attribute value of a previous vertex of a previous triangular mesh and previous neighborhood table for the previous vertex, including using a convolutional neural network with the neighborhood table as input.

17. The electronic apparatus as in claim 16, wherein the processing circuitry is further configured to:
  perform a quantization operation on the respective primary attribute value of each of the plurality of vertex parameter values.

18. The electronic apparatus as in claim 16, wherein the processing circuitry is further configured to:
  perform a quantization operation on the predicted primary attribute value.

19. The electronic apparatus as in claim 16, wherein the respective primary attribute value of a vertex parameter value of the plurality of vertex parameter values corresponding to a neighboring vertex of the set of neighboring vertices includes a position of the neighboring vertex and the predicted primary attribute value includes a predicted position of the vertex.

20. The electronic apparatus as in claim 16, wherein the respective secondary attribute value of a vertex parameter value of the plurality of vertex parameter values corresponding to a neighboring vertex of the set of neighboring vertices includes a valence of the neighboring vertex.

* * * * *